United States Patent [19]

Mooiweer

[11] Patent Number: 4,495,211
[45] Date of Patent: Jan. 22, 1985

[54] PROCESS FOR THE DECAFFEINATION OF GREEN COFFEE BEANS

[75] Inventor: Gerben D. Mooiweer, Nieuwegein, Netherlands

[73] Assignee: Douwe Egberts Koninklijke Tabaksfabriek Koffiebranderijen Theehandel N.V., Utrecht-th, Netherlands

[21] Appl. No.: 434,185

[22] Filed: Oct. 14, 1982

[30] Foreign Application Priority Data

Oct. 27, 1981 [NL] Netherlands ............ 8104854

[51] Int. Cl.³ .............................................. A23F 5/20
[52] U.S. Cl. ................................. 426/422; 426/427; 426/428; 544/274
[58] Field of Search ............... 426/422, 424, 427, 428; 544/274

[56] References Cited

U.S. PATENT DOCUMENTS

| | | | |
|---|---|---|---|
| 2,309,092 | 1/1943 | Berry et al. | 426/424 |
| 4,031,251 | 6/1977 | Margolis et al. | 426/422 X |
| 4,113,887 | 9/1978 | Kramer et al. | 426/422 |
| 4,113,888 | 9/1978 | Henig et al. | 426/422 |
| 4,160,042 | 7/1979 | Farr et al. | 426/422 X |
| 4,324,840 | 4/1982 | Katz | 426/422 |
| 4,331,694 | 5/1982 | Izod | 426/422 |
| 4,364,964 | 12/1982 | Van der Stegen | 426/422 |

FOREIGN PATENT DOCUMENTS

| | | | |
|---|---|---|---|
| 1123656 | 5/1982 | Canada | 426/427 |
| 8398 | 3/1980 | European Pat. Off. | 426/427 |
| 1488340 | 10/1977 | United Kingdom | 426/427 |

*Primary Examiner*—Joseph Golian
*Attorney, Agent, or Firm*—Cushman, Darby & Cushman

[57] ABSTRACT

A process for the decaffeination of green coffee beans by the extraction, in process stage (a), of soaked green coffee beans with an equilibrium extract of coffee beans, from which extract caffeine has been removed, resulting in caffeine-deficient beans, which are recovered, and an equilibrium extract of the beans, which in a series of successive process stages (b), (c), (d) and (e), is contacted with an adsorbent circulating counter-currently through the same process steps, said adsorbent having a preferential adsorption capacity for caffeine. The equilibrium extract from stage (a) together with solution from stage (e) are contacted in stage (b) with adsorbent from stage (c) with adsorption of caffeine from the solution. The resulting solution is partly returned to stage (a), and partly, in stage (e), contacted with "clean" adsorbent from stage (d). The resulting "clean" solution is contacted, in stage (d) with adsorbent from stage (e) with desorption of caffeine from said adsorbent. The resulting caffeine-rich solution is partly recovered and partly, in stage (e), contacted with adsorbent from stage (b).

5 Claims, 2 Drawing Figures

PROCESS FOR THE DECAFFEINATION OF GREEN COFFEE BEANS

BACKGROUND AND SUMMARY OF THE INVENTION

The decaffeination of green coffee beans is normally carried out by treating the soaked beans with an organic solvent. Commonly chlorinated hydrocarbons are used. In order to obviate the disadvantages inherent therein, it has also been proposed, for example, to use methyl ethyl ketone (Dutch patent application 76 04629). According to another proposal, the beans are not brought into direct contact with the organic solvent. First the beans are extracted with water, whereafter the caffeine is taken up from the aqueous extract by means of the organic solvent (U.S. Pat. No. 2,309,092, to Berry & Walters). Furthermore proposals have been made to avoid the use of organic solvents altogether. According to these proposals, the caffeine from the aqueous solution obtained by the extraction of the beans is taken up in solid adsorbents (Dutch patent application 78.07208). Naturally is it of importance to select such an adsorbent that the other water-solubles present in green coffee are adsorbed in as small a degree as possible. This is important for two reasons. In the first place one would want the beans to lose as little in weight as possible from the treatment. In the second place, the caffeine itself is valuable, and one would of course want to separate it from the mixture with other extracted substances in as simple a way as possible. In connection with the choice of an adsorbent, reference is made to Dutch patent application 78 07208, which describes an adsorbent that has important advantages. Nevertheless, the difficulties are not entirely solved by it.

In the aqueous extract of green coffee beans, chlorogenic acid occurs in a much higher proportion than caffeine. On average, the equilibrium extract of Arabica coffee contains about 10% by weight of caffeine, 45% chlorogenic acid, and 45% "other water solubles". These will hereinafter be termed "residuals". This residue contains in essence sugars. In this connection the term "equilibrium extract" means the following. The beans are first soaked in water to saturation. The soaked beans can be imagined, by way of a model, to consist of an aqueous solution (the equilibrium extract just referred to) taken up in an insoluble residue. The extraction process can be visualized as follows. First, by treating a separate portion of beans, an aqueous solution is made separately, which has the same composition as the equilibrium extract. If this equilibrium extract is contacted with a fresh portion of soaked beans, nothing is extracted from the beans, therefore. If, however, the aqueous solution that has been in contact with these last beans is treated with an adsorbent, certain substances are adsorbed, and if the aqueous extract thus treated is recycled, for example, counter-currently to soaked beans, such substances are extracted from these beans in such quantities as correspond to the quantities taken up in the adsorbent. When an adsorbent such as Duolite S761 is used, as indicated in NL 78 07208, it is found that the adsorbed substances consist approximately of 60% chlorogenic acid, 30% caffeine and 10% "residuals". It is accordingly seen that such an adsorbent has a preferential adsorption capacity for caffeine. Nevertheless, the problems persist that in addition to caffeine other substances are removed from the beans, and that the caffeine needs to be separated from the mixture of substances. All this means that the weight of the beans is reduced as a result of the extraction, that—addition to the disappearance of caffeine from them—the composition of the beans is also changed otherwise, and that the recovery of caffeine still involves considerable difficulties.

It is an object of the present invention to remove caffeine from green coffee beans, if necessary virtually entirely, exclusively by a combination of adsorption and desorption steps, using an adsorbent preferentially adsorbing caffeine from the aqueous equilibrium extract, and whereby the caffeine itself is obtained in a practically pure solution.

In its most generic form, the present invention provides a process for decaffeinating green coffee beans, comprising the following integrated process stages:

(a) contacting the soaked green coffee beans with a caffeine-deficient solution from stage (b), being an equilibrium extract of these beans from which caffeine has been withdrawn, resulting in caffeine-deficient beans on the one hand and an equilibrium extract of the beans, on the other;

(b) contacting the equilibrium extract of the green coffee beans, produced in stage (a), together with the solution of coffee bean components, produced in stage (e), with a caffeine-deficient adsorbent laden with non-caffeine coffee bean components, said adsorbent being produced in stage (c) and having a preferential adsorption capacity for caffeine, resulting, on the one hand, in a caffeine-deficient solution of coffee beans components, which is partially passed to stage (c) and partially recycled to stage (a), and, on the other hand, an adsorbent laden with coffee bean components, which is supplied to stage (e);

(c) contacting the caffeine-deficient solution of coffee bean components produced in stage (b), with "clean" adsorbent, resulting, on the one hand, in a "clean" aqueous solution and, on the other hand, in an adsorbent laden with soluble coffee bean components, but deficient in caffeine, which adsorbent is supplied to stage (b);

(d) contacting the "clean" aqueous solution produced in stage (c) with the adsorbent laden with coffee bean components and rich in caffeine from stage (e) for the desorption of said adsorbent, resulting, on the one hand, in "clean" adsorbent, which is supplied to stage (c) and, on the other hand, a solution of coffee bean components rich in caffeine, which solution is partially discharged and partially supplied to stage (e);

(e) contacting the caffeine-rich solution of coffee bean components from stage (d) with the adsorbent laden with soluble coffee bean components from stage (b), resulting, on the one hand, in a solution of coffee bean components, which is supplied to stage (b), and on the other hand in an adsorbent laden with soluble coffee bean components rich in caffeine, which is supplied to stage (d).

For "soaking" the green coffee beans, as referred to above, these are, as already stated above, kept in contact with water for such a period of time that they no longer absorb water. The term "equilibrium extract" is also defined hereinbefore. Where reference is made to the "laden" solvent, this means not only the adsorbent with the substances adsorbed thereon. The term includes all the material retained by the adsorbent, including those contained in the solution within the pores and between the particles of the adsorbent, which are carried along with the adsorbent mass when the adsorbent is passed in wet condition from one process stage to another.

It is clear that, as the exchange in the various process stages is allowed to proceed more completely, a higher degree of decaffeination is obtained, and also a purer solution of caffeine. This depends, of course, on the nature of the apparatus used for the exchange and the nature of the adsorbent. This will generally be counter-current apparatus with a greater or smaller amount of stages, as will be illustrated hereinafter in the example. If the exchange is caused to be effected thoroughly, the term "caffeine-deficient" in the above should in each case be read as "practically caffeine-free". The term "clean" as used in the above should, in this connection, also have a relative meaning. According as the exchange in the various process steps takes place more completely, so this term is to be construed more strictly.

The selectivity (the degree of preferential adsorption) of an adsorbent to be used must be determined empirically. The adsorbent is brought into equilibrium with solutions of given concentrations of caffeine, chlorogenic acid and residuals. By analysis the ratio is determined of the components in the resin and in the solution being in equilibrium with it. This is done for a variety of concentrations and concentration ratios. From all this a general picture emerges as to the selectivity under the conditions prevailing in the process.

It has been found that the resins of the formophenol type and, as stated before, in particular Duolite S761, have a good selectivity. Duolite S761 is a formophenolic resin produced by polymerizing or copolymerizing monomers with weakly acidic groups, so that the $P_{Ka}$ of the monomer with the acidic group is higher than about 6.5 $P_{Ka}$ values.

DETAILED DESCRIPTION OF THE EXEMPLARY EMBODIMENTS

Figure 1:
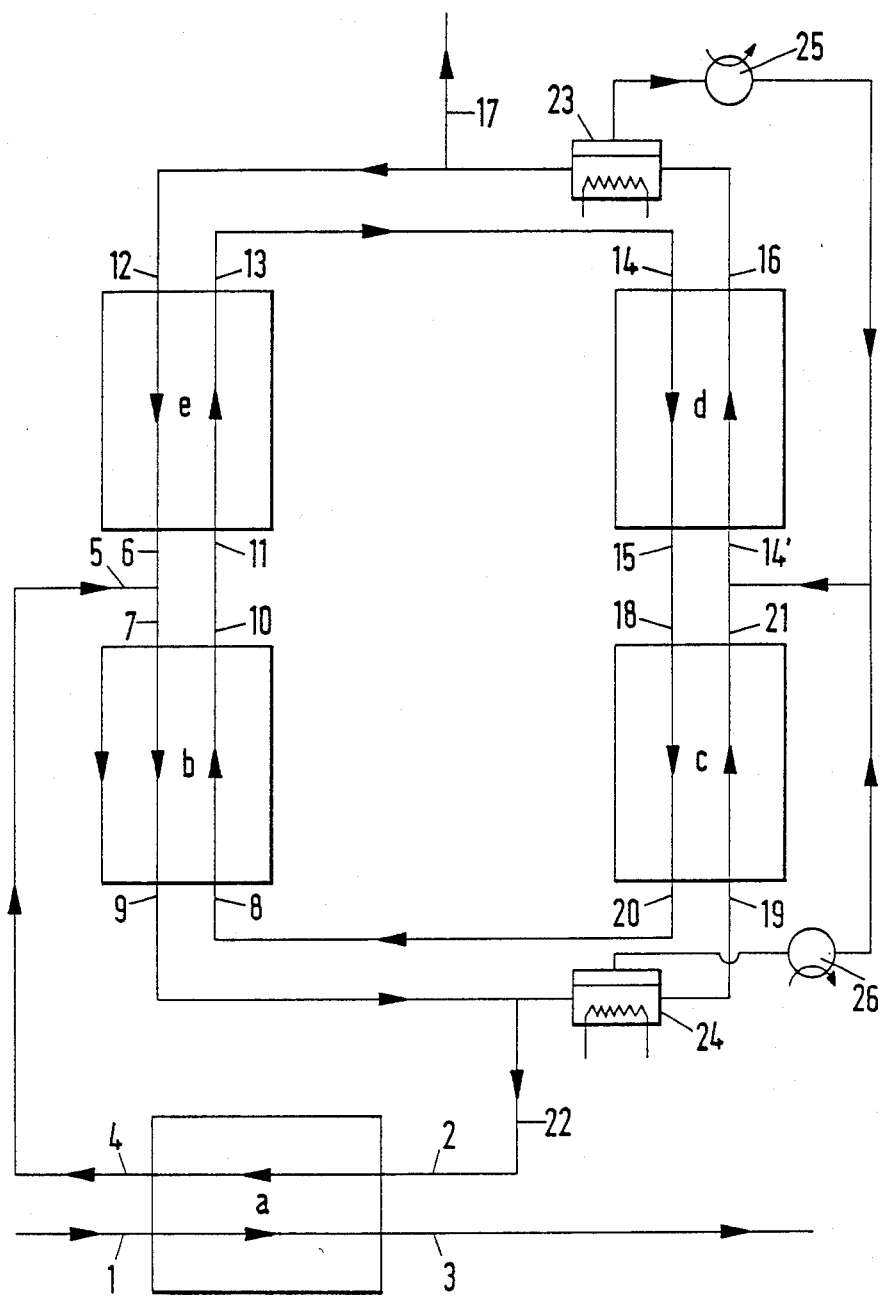
FIG. 1 is a diagrammatic flow sheet of the process of the present invention.

With reference to FIG. 1, the general principle of the process according to the invention will be schematically described. For the sake of simplicity this description will be based on an "ideal" case, in which total decaffeination takes place and the caffeine is obtained in 100% purity solution. The apparatus used for the exchange of substances will hereinafter be referred to as an "extractor".

At 1, the soaked green coffee beans enter a counter-current extractor a, in which they are contacted with a caffeine-free solution entering at 2, which solution, however, corresponds to the equilibrium extract, as defined above, as regards the concentration of chlorogenic acid and the "residuals". The decaffeinated coffee beans leave the apparatus at 3, and a stream of "equilibrium extract" issues at 4. This stream combines at 5 with a stream of solution 6 of coffee bean solubles coming from the counter-current extractor e. The combined stream enters the counter-current extractor b at 7, where it is contacted with a stream of adsorbent 8 which comes from counter-current extractor c. This stream of adsorbent is free from caffeine, and accordingly only contains chlorogenic acid and residuals. These latter pass into the solution that enters at 7 and leaves the counter-current extract b at 9, while conversely the caffeine migrates from the solution to the adsorbent. At 9 the solution is caffeine-free, whereas at 10 a stream of adsorbent b issues, which contains both caffeine and the other solubles of the green beans. This stream of adsorbent, which enters the counter-current extractor (e) at 11, is contacted with a stream of solution from the counter-current extractor d, which contains only caffeine. This stream enters at 12. At 13, a stream of adsorbent issues from the counter-current extractor e, which adsorbent only contains caffeine. Desorption is effected in counter-current current extractor d. In it, the stream of adsorbent laden with caffeine, entering at 14, is liberated from the caffeine by exchange with pure water, which enters at 14', and issued as a clean adsorbent at 15. At 16, a pure caffeine solution issues, which is in part passed to counter-current extractor e (entering it at 12), and for the rest is discharged at 17.

The clean adsorbent from d enters counter-current extractor c at 18, where it is contacted with a portion of the current of solution leaving the counter-current extractor b at 9. This stream enters at 19. It is free from caffeine and has a concentration of chlorogenic acid and residuals equal to that of the equilibrium extract. The adsorbent takes up these substances in c, and laden with them, leaves c at 20. The liquid issuing at 21 is pure water.

A portion of the solution issuing from b at 9 is branched off at 22, and supplied at 2 to the counter-current extractor a, as described hereinbefore.

With the adsorbents at present available, the process as described above is found to require extractors that would have to be unpractically large. A considerable improvement is obtained by connecting an evaporator 23 in the current of caffeine-rich solution that leaves the extractor at 16 and enters extractor e at 12, whereby the caffeine-rich solution is concentrated. An evaporator may also be connected in the stream of caffeine-free solution of chlorogenic acid and residuals which leaves extractor b at 9 and enters extractor c at 19, such evaporator to be connected downstream of the branch at 22, and whereby the solution is concentrated. This in indicated at 24. As a result of these features, extractors b, c and e may be of considerably smaller size. It is clear, however, that evaporation must not proceed to the extent that chlorogenic acid or caffeine is crystallized.

As follows from the above, the choice of the adsorbent must be such that it has a high caffeine affinity. This implies that the desorption in extractor d will not be easy and that the solution of caffeine moving counter-currently to the adsorbent should be kept as dilute as possible. This is achieved, for example, by condensing the vapour from evaporator 23 in a heat exchanger indicated at 25, and returning the water thereby produced to 14'. Water can in addition be added by condensing the vapour issuing from evaporator 24 in a heat exchanger 26, and passing the water thereby produced to the input 14' of extractor d.

Naturally, the concentration of the caffeine solution in d can be kept as low as one wants by increasing the rate of circulation in the circuit 14'-16-23-25-14'. In that case, however, the evaporating capacity of evaporator 23 must be greatly increased. The economic advantage with regard to a smaller size of d is then balanced by the economic disadvantage with regard to the higher evaporating capacity of evaporator 23.

In a preferred embodiment of the invention, therefore, for the desorption of the adsorbent laden with caffeine use is made of a liquid having a higher affinity to caffeine than has water. This can be done, for example, by introducing into the circuit just referred to—14'-16-23-25-14'—a water-miscible organic solvent having a high caffeine dissolving capacity and a lower boiling point than water. It has been found that ethyl alcohol is very suitable for this purpose, in particular a mixture of 30–40% alcohol and 70–60% water.

Figure 2:
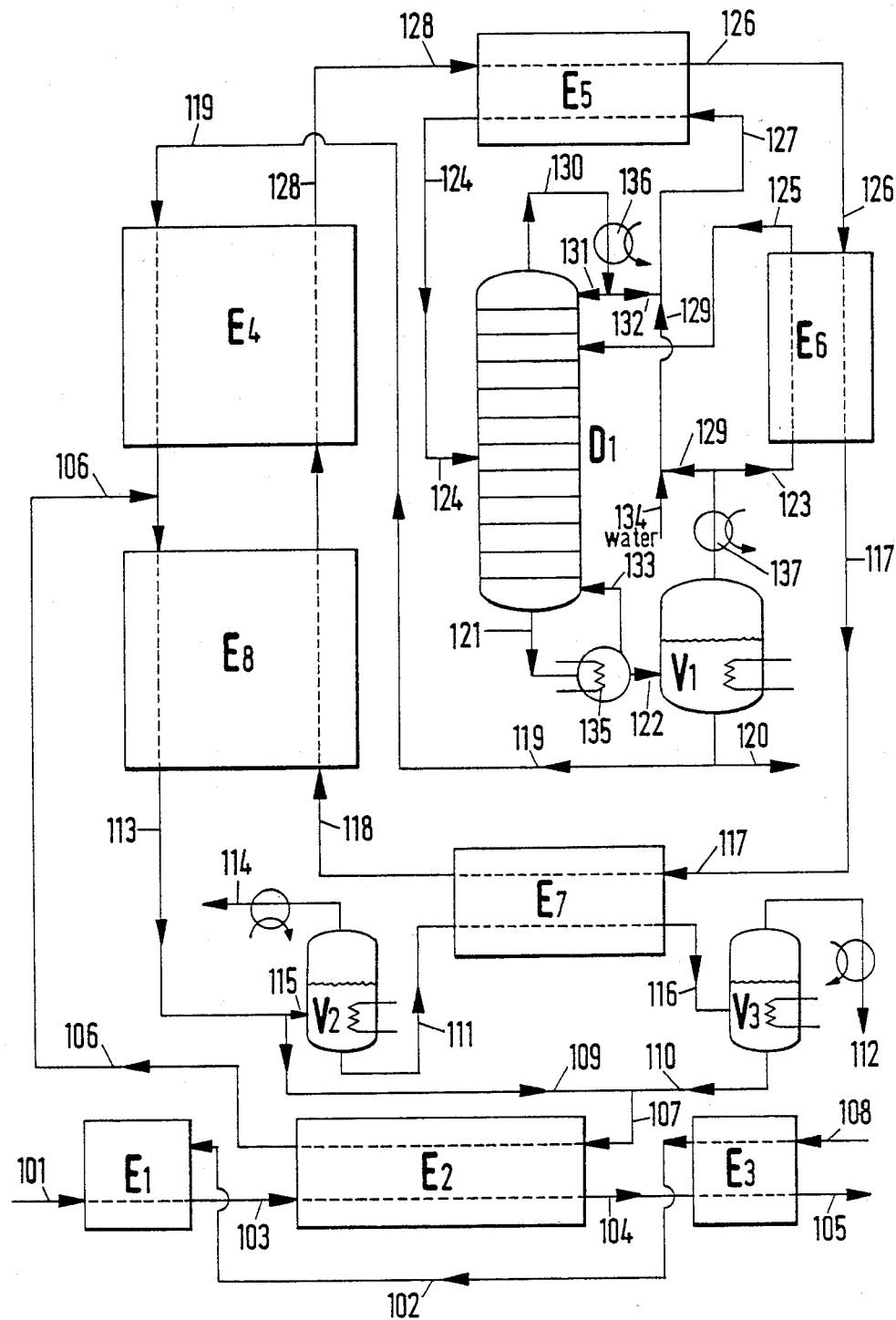
FIG. 2 is flow sheet of a particular embodiment of the present invention using the adsorbent Duolite S761 and an alcohol-water mixture as a desorbent.

FIG. 2 shows a detailed diagram for an embodiment using an alcohol-and-water mixture for the desorption. The scheme has been made on the basis of a plant having a capacity of 12500 tons of green coffee per annum, which corresponds to 0.5 kg green coffee per second. There will now follow a description on the basis of this scheme.

Table I specifies the compositions of the various streams (solution and adsorbent) which play a role in it, and Table II gives data as to the dimensions and nature of the extractors used and the distillation column for the mixture of alcohol and water. The extractors are of known manufacture. The beans and the adsorbent are supplied in a layer of specific height on an endless belt. On the belt, different sections are to be distinguished. The extraction liquid is circulated through the material per section, while naturally there is also a stream of extraction liquid that runs from section to section. The rate of flow naturally relates to the total stream passing through an extractor. The temperature in the extractors is 95° C. The adsorbent used is the synthetic resin Duolite S761 of Diamond Shamrock. This turns out to have a much higher affinity to caffeine than to chlorogenic acid and the residuals from the equilibrium extract of the green beans. For the rest the following should be read with the knowledge of the principles as described with reference to FIG. 1.

A quantity of 0.5 kg dry green coffee per second enters the process as stream 101. This dry green coffee is fully soaked with the water stream 102 in soaker E1. The fully soaked green bean stream 103 passes to extractor E2, and is there, under counter-current conditions, stripped of its caffeine with an aqueous extract stream 107 which, as regards chlorogenic acid and residuals has the composition of the equilibrium extract as defined hereinbefore. The stream 104 of green beans, still freshly soaked, but decaffeinated, is washed in washer E3 with the stream of water 108, whereby appendant solubles are entrained to stream 102. The resulting stream 105 of green beans is dried to its original moisture content, and can be roasted and ground in the normal manner.

The stream 106 which has taken up the caffeine from the green beans in extractor E2 is passed to extractor E8. By far the greater part of the caffeine in stream 106 is carried off from E8 with an incoming stream of resin 118 to extractor E4, from which it is ultimately removed by stream 128. Issuing from E8 is a stream of solution 113 which virtually exclusively contains chlorogenic acid and residuals. Stream 113 is split into stream 115 and stream 109. Stream 115 is concentrated in evaporator V2 to form a stream 111, whereafter virtually all dry matter dissolved in stream 111 is laden on to a "clean" resin stream 117. This takes place in extractor E7. The laden stream of resin is passed into E8 as stream 118. Owing to the low affinity of Duolite S761 for the residuals, somewhat of these residuals is left in the stream 116 leaving the extractor E7. The stream 116 is concentrated in evaporator V3, and leaves V3 as stream 110. Stream 109 is brought, together with stream 110, to the correct equilibrium composition with regard to chlorogenic acid and residuals, and returned as stream 107 to the green bean extractor E2.

The caffeine-rich resin stream 128 leaving extractor E4 must be desorbed. This is effected in extractor E5 with a mixture of alcohol and water. The result is a clean resin stream 126, which, however, still contains an alcohol-water mixture in its pores. The alcohol in the pores is washed out by means of clean water in extractor E6. The result is a clean resin stream without alcohol 117, and this resin stream is passed to E7. The caffeine-rich solution stream 124 coming from extractor E5 and the stream 125 coming from the resin stage E6 are supplied to a distillation column D1 equipped with sieve trays. The water stream 121 from the bottom section of the distillation column D1 contains all of the caffeine and some chlorgenic acid that were contained in resin stream 128. A portion of stream 121 is evaporated in "reboiler" 135, and the vapour returned as stream 133 to the distillation column D1 for it to serve as a driving medium for the distillation process. Furthermore, in normal manner, at the top of the distillation column the alcohol-rich vapour stream 130 is condensed in condensor 136. A portion of the condensate is returned as recycle stream 131 to the distillation column. The balance is combined as stream 132 with the steam of water 129, whereafter the mixture is passed as stream 127 to extractor E5.

The stream 122 from "reboiler" is passed to evaporator V1. The concentrate from this evaporator is divided into a reflux current 119, which, laden with caffeine, is returned to extractor E4, and a product stream 120, also laden with caffeine, from which, if desired, caffeine can be recovered by crystallization. The water vapour from evaporator V1 is condensed in heat exchanger 137. Part of the condensate is passed, as stream 123, to the "washing" extractor E6, and the rest is combined, as stream 129, with the alcohol-rich stream 132 as described above.

TABLE I

| Stream | Description | Flow Rate | | Caffeine | | Chlorogenic Acid | | Water | | Water-soluble dry matter total | | Alcohol |
|---|---|---|---|---|---|---|---|---|---|---|---|---|
| 101 | green beans | 0.5 | kg/s | 1 | wt % | 6.5 | wt % | 11 | wt % | 23 | wt % | — |
| 102 | water | 0.5 | kg/s | ~0 | | 0.5 | wt % | | | 1.8 | wt % | — |
| 103 | green beans | 1 | kg/s | 0.5 | wt % | 3.25 | wt % | 55.5 | wt % | 11.5 | wt % | — |
| 104 | green beans | 1 | kg/s | <0.01 | wt % | 3.2 | wt % | 55.5 | wt % | 10.95 | wt % | — |
| 105 | green beans | 0.5 | kg/s | <0.02 | wt % | 6.4 | wt % | 11 | wt % | 21.9 | wt % | — |
| 106 | aqueous extract | 1.31 | l/s | 3.8 | g/l | 52 | g/l | | | 180 | g/l | — |
| 107 | aqueous extract | 1.31 | l/s | <0.075 | g/l | 51.6 | g/l | | | 176 | g/l | — |
| 108 | washing water | 0.5 | kg/s | 0 | | 0 | | | | 0 | | — |
| 109 | aqueous extract | 0.9 | l/s | 0.06 | g/l | 65.2 | g/l | | | 167 | g/l | — |
| 110 | aqueous extract | 0.41 | l/s | 0.01 | g/l | 21.9 | g/l | | | 196 | g/l | — |
| 111 | aqueous extract | 1.38 | l/s | 0.08 | g/l | 90 | g/l | | | 231 | g/l | — |

TABLE I-continued

| Stream | Description | Flow Rate | | Caffeine | | Chlorogenic Acid | | Water | | Water-soluble dry matter total | | Alcohol | |
|---|---|---|---|---|---|---|---|---|---|---|---|---|---|
| 112 | water | 0.97 | l/s | 0 | | 0 | | | | 0 | | — | |
| 113 | aqueous extract | 2.81 | l/s | 0.06 | g/l | 65.2 | g/l | | | 167 | g/l | — | |
| 114 | water | 0.53 | l/s | 0 | | 0 | | | | 0 | | — | |
| 115 | aqueous extract | 1.91 | l/s | 0.06 | g/l | 65.2 | g/l | | | 167 | g/l | — | |
| 116 | aqueous extract | 1.38 | l/s | 0.002 | g/l | 6.5 | g/l | | | 58 | g/l | — | |
| 117 | resin | 1 | kg/s | 0.05 | g/kg W.R. | 0.05 | g/kg W.R. | 540 | g/kg W.R. | | | — | |
| 118 | resin | 1 | kg/s | 0.163 | g/kg W.R. | 115.3 | g/kg W.R. | 540 | g/kg W.R. | 90 | g/kg W.R. | — | |
| 119 | water | 1.5 | l/s | 50 | g/l | 5 | g/l | | | | | | |
| 120 | water | 0.098 | l/s | 50 | g/l | 5 | g/l | | | | | | |
| 121 | water | 6.39 | kg/s | 12.5 | g/l | 1.25 | g/l | | | | | <0.001 | wt % |
| 122 | water | 3.15 | kg/s | 25.4 | g/l | 2.54 | g/l | | | | | <0.001 | wt % |
| 123 | water | 0.9 | kg/s | 0 | | 0 | | | | | | 0 | |
| 124 | alcohol/water | 5.0 | kg/s | 16 | g/l | 1.6 | g/l | 71 | wt % | | | 29 | wt % |
| 125 | alcohol/water | 0.9 | kg/s | 0 | | 0 | | 80 | wt % | | | 20 | wt % |
| 126 | resin stream | 1 | kg/s | 0.05 | g/kg W.R. | 0.05 | g/kg W.R. | 360 | g/kg W.R. | | | 180 | g/kg W.R. |
| 127 | alcohol/water | 5 | kg/s | 0 | | 0 | | 67 | wt % | | | 33 | wt % |
| 128 | resin stream | 1 | kg/s | 79.9 | g/kg W.R. | 7.99 | g/kg W.R. | 540 | g/kg W.R. | | | 0 | |
| 129 | water | 2.25 | kg/s | 0 | | 0 | | 100 | wt % | | | 0 | |
| 130 | alcohol/water | 3.24 | kg/s | 0 | | 0 | | 40 | wt % | | | 60 | wt % |
| 131 | alcohol/water | 0.49 | kg/s | 0 | | 0 | | 40 | wt % | | | 60 | wt % |
| 132 | alcohol/water | 2.75 | kg/s | 0 | | 0 | | 40 | wt % | | | 60 | wt % |
| 133 | water | 3.24 | kg/s | 0 | | 0 | | 100 | wt % | | | 0 | |
| 134 | water | 1.5098 | kg/s | 0 | | 0 | | 100 | wt % | | | | |

W.R. = wet resin.

TABLE II

| Apparatus | Description | Length | Width | Height | Number of sections |
|---|---|---|---|---|---|
| $E_1$ | wetting green beans | 1.2 m | 2 m | 2 m | 1 |
| $E_2$ | extraction green beans | 14 m | 2 m | 2 m | 21 |
| $E_3$ | washing green beans | 1 m | 2 m | 2 m | 4 |
| $E_4$ | top section extract/resin distillation | 10 m | 0.6 m | 2 m | 40 |
| $E_5$ | washing resin | 24 m | 0.6 m | 2 m | 29 |
| $E_6$ | alcohol washing resin | 3 m | 0.6 m | 2 m | 5 |
| $E_7$ | lading clean resin | 10 m | 0.6 m | 2 m | 40 |
| $E_8$ | bottom section extract/resin distillation | 15 m | 0.6 m | 2 m | 32 |
| $D_1$ | alcohol/water sieve tray dist. column: | diameter = 1.6 m total height = 3.3 m interior: 9 sieve trays | | | |

I claim:

1. A continuous process for the decaffeination of green coffee beans, comprising the following integrated process stages:

(a) contacting the green coffee beans after soaking in water with a caffeine-deficient aqueous solution from stage (b), being an equilibrium extract of these beans from which caffeine has been withdrawn, resulting in caffeine-deficient beans on the one hand and an equilibrium extract of the beans on the other;

(b) contacting the equilibrium extract of the green coffee beans, produced in stage (a) together with the solution of coffee bean components, produced in stage (e), with a caffeine-deficient adsorbent loaded with non-caffeine coffee bean components, and loaded adsorbent being produced in stage (c) and having a preferential adsorption capacity for caffeine, resulting, on the one hand, in a caffeine-deficient solution of coffee bean components, which solution is concentrated by evaporation, the distillate being condensed and returned to stage (d) while the concentrate is partially passed to stage (c) and partially recycled to stage (a), and, on the other hand, an adsorbent loaded with coffee bean components, which loaded adsorbent is supplied to stage (e);

(c) contacting the caffeine-deficient solution of coffee bean components, produced in stage (b), with clean adsorbent, resulting, on the one hand, in a clean aqueous solution and, on the other, in an adsorbent loaded with soluble coffee bean components, but deficient in caffeine, which loaded adsorbent is supplied to stage (b);

(d) contacting the clean aqueous solution produced in stage (c) with the adsorbent loaded with coffee bean components rich in caffeine, which solution is concentrated by evaporation, the distillate being condensed and returned to stage (d) while the concentrate is partially discharged and partially supplied to stage (e);

(e) contacting the caffeine-rich solution of coffee bean components from stage (d) with the adsorbent loaded with soluble coffee bean components from stage (b), resulting, on the one hand, in a solution of coffee bean components, which is supplied to stage (b), and on the other hand, in an adsorbent loaded with soluble coffee bean components rich in caffeine, which is supplied to stage (d).

2. A process according to claim 1, wherein the caffeine-rich solution produced in stage (d) is concentrated by evaporation prior to being supplied to stage (e), the distillate is condensed and returned to stage (d), and the portion of the caffeine-deficient solution rich in chlorogenic acid, produced in stage (b) and supplied to stage (c) is concentrated by evaporation before being supplied to stage (c).

3. A process according to claim 2, wherein, in stage (d), for the desorption of the caffeine-rich adsorbent from stage (e), a mixture of water and a water-miscible organic solvent having a lower boiling point than water and having a higher affinity to caffeine than has pure water, separating from the caffeine-rich solution produced with this mixture a caffeine-rich aqueous solution by means of fractionated distillation, and discharging a portion of said caffeine-rich aqueous solution as a product and passing another portion to stage (e).

4. A process according to claim 3, wherein a mixture of alcohol and water is used for the desorption of the adsorbent in stage (d).

5. A process according to claim 4, wherein the mixture used for the desorption in stage (d) comprises 60–70% water and 40–30% alcohol.

* * * * *